United States Patent [19]
Kanda

[11] Patent Number: 4,749,173
[45] Date of Patent: Jun. 7, 1988

[54] FLUID-FILLED RESILIENT BUSHING HAVING DAMPING MEANS WITHIN FLUID CHAMBERS

[75] Inventor: Ryouji Kanda, Inuyama, Japan

[73] Assignee: Tokai Rubber Industries, Ltd., Aichi, Japan

[21] Appl. No.: 66,017

[22] Filed: Jun. 24, 1987

[30] Foreign Application Priority Data

Jun. 30, 1986 [JP] Japan ............................ 61-100615[U]

[51] Int. Cl.$^4$ .......................... F16M 1/02; F16M 5/00; F16M 7/00; B62D 21/00
[52] U.S. Cl. ................................ 267/140.1; 150/312; 745/562
[58] Field of Search .................. 267/140.1, 35, 259, 267/219; 180/300, 312, 902; 248/562, 636

[56] References Cited

U.S. PATENT DOCUMENTS

| | | | |
|---|---|---|---|
| 3,642,268 | 2/1972 | Hipsher. | |
| 3,698,703 | 10/1972 | Hipsher. | |
| 4,630,806 | 12/1986 | Dan et al. | 267/140.1 |
| 4,690,389 | 9/1987 | West | 248/562 X |
| 4,700,934 | 10/1987 | Andrä et al. | 248/562 X |
| 4,702,346 | 10/1987 | Uno et al. | 267/140.1 X |

Primary Examiner—Andres Kashnikow
Assistant Examiner—Richard Potosnak
Attorney, Agent, or Firm—Parkhurst & Oliff

[57] ABSTRACT

A fluid-filled resilient bushing including a resilient member interposed between inner and outer sleeves, and an elastically yieldable partition member. The resilient member and the partition member cooperate with a sealing sleeve to define a pressure-receiving chamber and an equilibrium chamber, which are disposed opposite to each other in a first direction in which the bushing receives a vibrational load. The chambers communicate with each other through an orifice. The bushing includes a stopper block which has a stopper portion disposed within the pressure-receiving chamber, so as to extend in the radial direction. The stopper portion has a radial end face whose periphery is spaced apart from the periphery of the pressure-receiving chamber. A damping member is fixedly provided on the radial end face of the stopper portion. The peripheral portion of the restrictor member projects from the periphery of the radial end face of the stopper portion, such that an annular gap is formed between the peripheral portion and the periphery of the pressure-receiving chamber. This annular gap serves to isolate high-frequency vibrations.

12 Claims, 3 Drawing Sheets

FLUID-FILLED RESILIENT BUSHING HAVING DAMPING MEANS WITHIN FLUID CHAMBERS

BACKGROUND OF THE INVENTION

1. Field of the Invention

The present invention relates in general to a fluid-filled resilient or elastic bushing structure, and more particularly to such a bushing structure which is capable of exhibiting excellent spring characteristics for both low-frequency vibrations and high-frequency vibrations that are applied thereto in a diametric direction of the structure.

2. Discussion of the Prior Art

There is known a resilient bushing for elastically connecting two members in a vibration system (through which vibrations are transmitted), for damping and/or isolating vibrations applied to the bushing in a given diametric direction of the bushing. The bushing has an inner sleeve in which a mounting rod or bolt is inserted, an outer sleeve on which a cylindrical mounting member is fitted, and a resilient member interposed between the inner and outer sleeves. For example, such a resilient bushing is used as a suspension bushing in a suspension system of an automotive vehicle, or an engine mount for mounting a power unit on the body of an F-F vehicle (front-engine, front drive vehicle).

Usually, the resilient bushing of the type indicated above is required to exhibit high vibration isolating characteristic for high-frequency vibrations having a small amplitude, and high vibration damping characteristic for low-frequency vibrations having a large amplitude. The traditional resilient bushing relies solely on the elastic nature (elastic deformation) of a resilient or elastic member, to provide both the vibration isolating capability and the vibration damping capability. Therefore, the bushing is difficult to satisfy these two different requirements. In particular, the traditional resilient bushing is not satisfactory in its capability of damping the low-frequency vibrations of large amplitudes.

In the light of the above inconvenience, a fluid-filled resilient bushing has been proposed in recent years. An example of such a fluid-filled bushing is disclosed in U.S. Pat. Nos. 3,642,268 and 3,698,703. This fluid-filled bushing has a pair of fluid chambers formed in a resilient member such that the fluid chambers are located opposite to each other in a diametric direction of the bushing in which vibrations are applied. These fluid chambers are filled with a suitable incompressible fluid, and communicate with each other through an orifice, so that the fluid may flow through the orifice, between the two chambers, upon application of low-frequency vibrations of a large amplitude in the diametric direction of the bushing.

In the fluid-filled bushing indicated above, the input low-frequency vibrations can be effectively damped due to inertia and resonance of the fluid mass in the orifice. The frequency range of the vibrations to be damped can be selected by suitably dimensioning the orifice.

If the orifice of this type of fluid-filled resilient bushing is dimensioned (in terms of its length and cross sectional area or diameter) so as to provide excellent damping characteristic for vibrations in a low frequency range, then the vibration isolating capability of the bushing is accordingly reduced for the high-frequency vibrations having a small amplitude. Thus, there has been a need to develop a fluid-filled resilient bushing which is satisfactory in the overall vibration damping and isolating capability or characteristic.

Also proposed is a fluid-filled resilient bushing of a type which has a pressure-receiving chamber adapted to receive vibrations to be damped, and an equilibrium chamber partially defined by an elastically yieldable thin-walled partition member. The pressure-receiving chamber and the equilibrium chamber communicate with each other through an orifice, and elastic deformation of the partition member permits a change in the volume of the equilibrium chamber. In this arrangement, the volume of the pressure-receiving chamber can be changed with flows of the fluid between the two chambers through the orifice, accompanied by elastic deformation of the partition member of the equilibrium chamber. This type of fluid-filled bushing provides excellent damping characteristics based on the flow resistance of the orifice and the inertia of the fluid masses, for low-frequency vibrations having a large amplitude. However, like the bushing disclosed in the United States Patents identified above, the bushing having such pressure-receiving and equilibrium chambers fails to provide satisfactory overall damping and isolating capability for both low-frequency and high-frequency vibrations of different amplitudes.

Another type of fluid-filled bushing has been proposed, as disclosed in U.S. Pat. Nos. 4,159,091 and 4,422,779. This bushing employs a pressure-absorber mechanism incorporating a movable plate which is disposed between two fluid chambers, so as to partially define these chambers. The movable plate is adapted to be moved by changing pressures in the two chambers, thereby contributing to lowering the dynamic spring constant of the bushing, for effectively isolating high-frequency vibrations of a small amplitude. However, the bushing using such a pressure-absorber mechanism tends to be extremely complicated in construction and accordingly less economical to manufacture, and requires a relatively large space for the pressure-absorber mechanism, causing the bushing structure to be bulky.

SUMMARY OF THE INVENTION

It is therefore an object of the present invention to provide an improved fluid-filled resilient bushing which is capable of exhibiting not only excellent damping characteristic for low-frequency vibrations of large amplitudes, but also excellent isolating characteristic for high-frequency vibrations of small amplitudes.

The above object may be achieved according to the present invention, which provides a fluid-filled resilient bushing, comprising: (a) an inner sleeve; (b) an outer sleeve disposed in radially outwardly spaced-apart relation with the inner sleeve, and having a plurality of apertures; (c) a sealing sleeve fitted on an outer circumferential surface of the outer sleeve, so as to fluid-tightly close the plurality of apertures; (d) a generally annular resilient member interposed between the inner and outer sleeves so as to connect the inner and outer sleeves, and having a pocket and an axial void which are located opposite to each other in a diametric direction of the inner sleeve parallel to a first direction in which the bushing is adapted to receive a vibrational load, the pocket being aligned with one of the apertures in the outer sleeve, and the void being formed over an entire axial length of the bushing, the sealing sleeve and the resilient member cooperating to define a fluid-tight pressure-receiving chamber such that the above-indicated one of the apertures is fluid-tightly closed by the sealing sleeve, the pressure receiving chamber being filled with an incompressible fluid; (e) an elastically yieldable thin-walled partition member disposed in the axial void, so as to form at least one recess aligned with the rest of the plurality of apertures, respectively, the sealing sleeve and the resilient member cooperating with each other to define at least one equilibrium chamber such that the rest of the apertures is fluid-tightly closed by the sealing sleeve, the at least one equilibrium chamber being filled with the incompressible fluid; (f) means for defining at least one orifice which communicates with the pressure-receiving chamber and the at least one equilibrium chamber, and which permits the incompressible fluid to flow between the pressure-receiving chamber and the at least one equilibrium chamber; (g) a stopper block supported by the inner sleeve, and having a stopper portion which is disposed within the pressure-receiving chamber and which extends from a bottom of the pocket, substantially in the above-indicated first direction, the stopper portion having a radial end face spaced apart from the outer sleeve by a predetermined radial distance in the first direction, the radial end face having a peripheral edge which is spaced apart from a periphery of the pressure-receiving chamber in a second direction perpendicular to the first direction, the peripheral edge of the radial end face and the periphery of the pressure-receiving chamber cooperating to define therebetween an annular spacing in a plane which is parallel to the second direction and an axial direction of the bushing; and (h) damping means provided on the radial end face of the stopper portion of the stopper block, the damping means projecting from the peripheral edge of the radial end face substantially in the second direction, such that the damping means cooperates with the periphery of the pressure-receiving chamber, to define in said plane an annular gap which is smaller than the annular spacing.

In the fluid-filled resilient bushing of the present invention constructed as described above, input vibrations having comparatively low frequencies and comparatively large amplitudes may be effectively damped or attenuated, due to inertia and resonance of the fluid in the orifice when the fluid is forced to flow through the orifice between the pressure-receiving chamber and the at least one equilibrium chamber, upon application of the vibrations to the bushing in the direction in which the pressure-receiving chamber and the axial void are disposed in diametrically opposed relation with each other. Namely, the orifice permitting a restricted flow of the fluid therethrough is so dimensioned as to attain excellent damping of low-frequency vibrations of large amplitudes.

Since the orifice is dimensioned as described above, the orifice does not permit sufficient flows of the fluid therethrough when the bushing receives high-frequency vibrations having a small amplitude. Namely, the bushing cannot rely upon the fluid flows through the orifice, to provide a sufficiently low dynamic spring constant for isolating such high-frequency vibrations. However, the instant bushing is capable of isolating the high-frequency vibrations, due to inertia and resonance of the fluid masses which flow through the annular gap formed between the periphery of the pressure-receiving chamber, and the damping means which projects from the periphery of the radial end face of the stopper portion of the stopper block within the pressure-receiving chamber. More particularly, the high-frequency vibrations applied to the bushing in the diametric direction will cause the fluid to flow through the annular gap in the radial direction of the bushing, between the radially inner and outer sections of the pressure-receiving chamber which are substantially separated by the damping means. In other words, the damping means is dimensioned and positioned relative to the periphery of the pressure-receiving chamber, so as to isolate vibrations which have higher frequencies and smaller amplitudes than those of the vibrations that can be damped by the restricted flows of the fluid through the orifice.

Thus, low-frequency vibrations of large amplitudes can be damped due to the inertia and resonance of the fluid mass which is forced to flow through the orifice, as in the conventional fluid-filled bushing, while high-frequency vibrations of small amplitudes can be effectively isolated or blocked by the inertia and resonance of the fluid mass which is forced to flow through the annular gap formed between the damping means and the periphery of the pressure-receiving chamber. Hence, the present fluid-filled resilient bushing exhibits better vibration isolating characteristic over the conventional bushing, and therefore provides improved overall damping and isolating capability for the vibrations applied in the diametric direction in which the pressure-receiving chamber and the axial void are arranged in mutually opposed relation.

As indicated above, the present bushing is given the above-mentioned excellent characteristic for high-frequency vibrations, by simply providing the damping means on the radial end face of the stopper portion within the pressure-receiving chamber. This arrangement is significantly simpler in construction and more economical to manufacture, than the conventional bushing equipped with a pressure-absorber mechanism incorporating a movable plate.

Furthermore, the stopper portion disposed within the pressure-receiving chamber is adapted to be abuttable at its radial end face upon the sealing sleeve, in the event that the inner sleeve and the outer sleeve (sealing sleeve) are excessively displaced relative to each other in the diametric direction in which the pressure-receiving chamber and the axial void are disposed. Accordingly, the stopper block protects the annular resilient member between the inner and outer sleeves, from excessive elastic deformation upon excessive relative displacement between the two sleeves. Stated differently, the stopper block prevents an excessive amount of relative displacement between the two members (mounting rod and cylindrical member) which are connected to the inner and outer sleeves of the bushing.

According to one feature of the present invention, the damping means forms a peripheral portion of the radial end face of a restrictor member secured to the radial end of the stopper portion. In one form of this feature of the invention, the restrictor member has a pair of axial projections which project from the peripheral edge of the radial end face of the stopper portion of the stopper block, and a pair of circumferential projections which project from the peripheral edge of the radial end face in a substantially circumferential direction of the generally annular resilient member. In this case, the circumferential projections are spaced apart from an inner circumferential surface of the outer sleeve by a predetermined distance in the second direction perpendicular to the first direction in which the vibrations are applied to the bushing. In another form of the same feature of the invention, the restrictor member includes a radially inner metallic portion secured to the radial end of the stopper portion, and a radially outer elastic portion secured to the radially inner metallic portion.

In a further form of the above feature of the invention, the restrictor member has a generally arcuate cross sectional shape taken in a plane perpendicular to an axis of the bushing. In a still further form of the same feature, the restrictor member is secured to the radial end face of the stopper portion by threaded fastening means.

In a still further form of the same feature of the invention, a dimension of the peripheral portion of the restrictor member as measured in the above-indicated first direction, and an area of the annular gap as measured in the above-indicated plane, are determined so that high-frequency vibrations are isolated in the pressure-receiving chamber.

According to another feature of the invention, the stopper block has another stopper portion disposed within the void opposite to the pocket.

In accordance with a further feature of the invention, the elastically yieldable partition member includes a pair of partition walls defining a pair of recesses which cooperate with the sealing sleeve to define a pair of equilibrium chambers.

According to a still further feature of the invention, the outer sleeve has at least one circumferential groove formed in the outer circumferential surface. This groove is fluid-tightly closed by the sealing sleeve, whereby the orifice is formed.

The pocket may preferably be formed in an axially middle portion of the generally annular resilient member. The inner and outer sleeves may be disposed eccentrically with each other in the above-indicated first direction, so that the inner and outer sleeves are brought into concentric relation with each other when the bushing is mounted in place, for example, a body of a vehicle and a power unit including an engine.

BRIEF DESCRIPTION OF THE DRAWINGS

The above and optional objects, features and advantages of the present invention will become more apparent by reading the following detailed description of a preferred embodiment of the invention, when considered in conjunction with the accompanying drawings, in which.

DETAILED DESCRIPTION OF THE PREFERRED EMBODIMENT

To clarify the concept of the present invention, the cylindrical engine mount for an F-F (front-engine front-drive) vehicle, constructed according to one embodiment of the invention, will be described in detail, by reference to the accompanying drawings. The engine mount is used for mounting a power unit on the body of the F-F vehicle.

Figure 1:
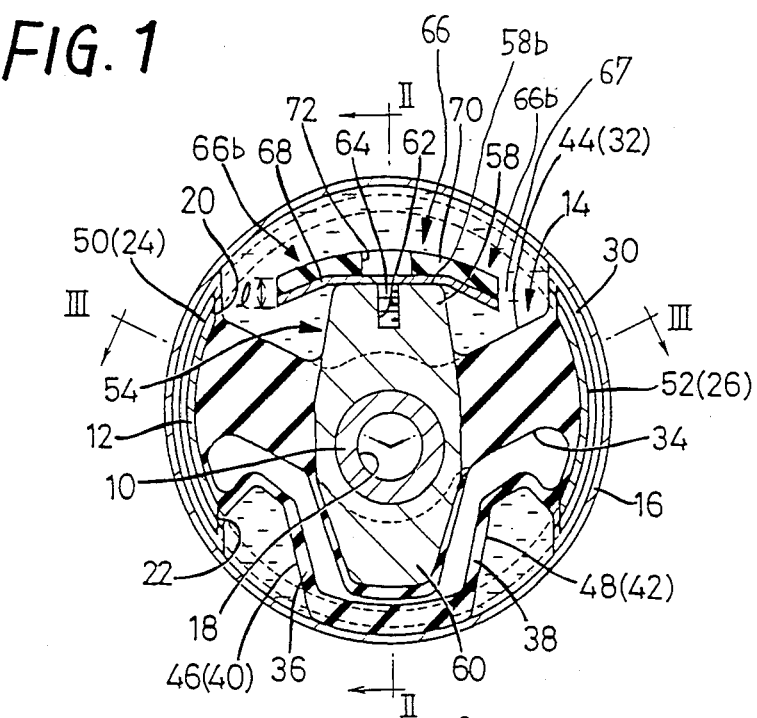
FIG. 1 is an elevational view in axial cross section of one embodiment of a fluid-filled resilient bushing of the invention in the form of an engine mount for an automotive vehicle of a front-engine, front-drive type.
Figure 3:
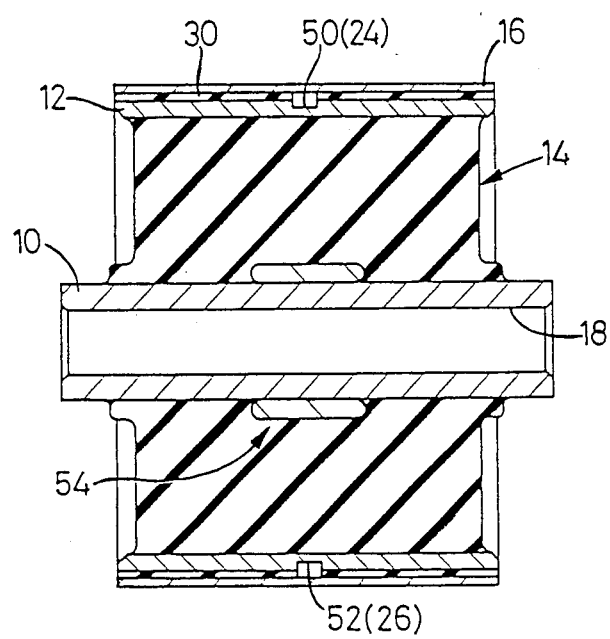

Referring first to FIGS. 1 and 3, reference numerals 10 and 12 designate an inner sleeve and an outer sleeve, respectively, both of which are made of metallic materials. The inner sleeve and the outer sleeve are disposed eccentrically with each other in a diametric direction of the bushing. A resilient member in the form of a generally annular rubber block 14 is interposed between the inner and outer sleeves 10, 12 so as to elastically connect these sleeves. A sealing sleeve 16 made of a metallic material is fitted on the outer surface of the outer sleeve 12. The present engine mount is installed between the power unit and the body of the vehicle, such that a cylindrical fitting secured to one of the two members of the vehicle is fitted on the outer surface of the sealing sleeve 16, while a mounting rod secured to the other of the two members is inserted through a bore 18 of the inner sleeve 10. The inner and sealing sleeves 10, 16 (the inner and outer sleeves 10, 12) are brought into concentric relation with each other when the resilient bushing is installed in place while receiving the weight of the power unit. The rubber block 16 is integrally secured to the outer surface of the inner sleeve 10 and the inner surface of the outer sleeve 12 by means of vulcanization.

Figure 4:
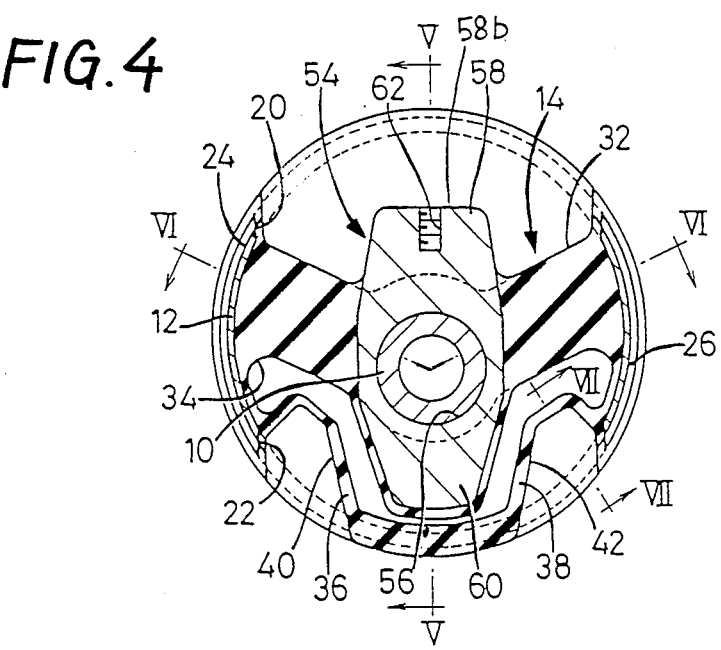
FIG. 4 is a cross sectional view corresponding to that of FIG. 1, showing an assembly of the bushing including a rubber block secured to metallic members by vulcanization, before attachment of a sealing sleeve to the inner assembly.
Figure 6:
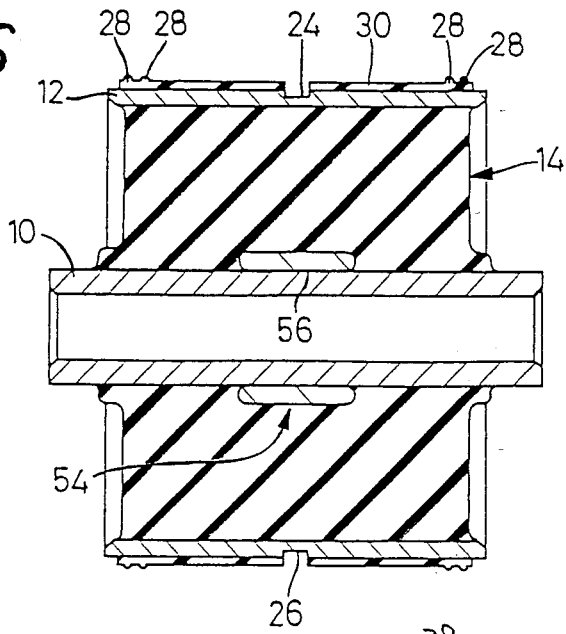
Figure 7:
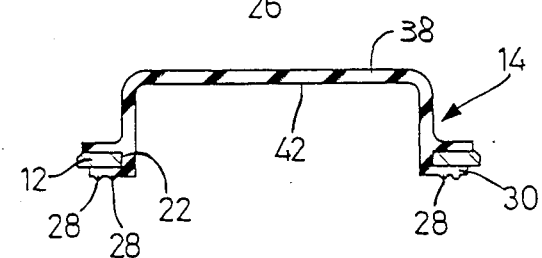

The outer sleeve 12 secured to the outer circumferential surface of the rubber block 14 has a pair of apertures 20, 22. As shown in FIGS. 4 and 6, these apertures 20, 22 are disposed opposite to each other in a diametric direction of the bushing in which the bushing receives a vibrational load. This direction is hereinafter referred to as "vibration-input direction". In diametrically opposite portions of the outer circumferential surface of the outer sleeve 12, there are formed a pair of circumferential grooves 24, 26 for connecting the appertures 20, 22. Further, a sealing rubber layer 30 is secured by vulcanization to the entire outer surface of the outer sleeve 12, except its areas in which the circumferential grooves 24, 26 are open. The sealing rubber layer 30 is formed as an integral part of the rubber block 14 and has a pair of sealing lips 28 at each of the opposite axial ends of the bushing.

Reference is now made to FIGS. 4–7. In an axially middle portion of the rubber block 14, there is formed a pocket 32 which is aligned with the aperture 20 in the outer sleeve 12. The rubber block 14 further has a void 34 aligned with the other aperture 22, such that the void 34 extends over an entire axial length of the rubber block 14. There is disposed in the void 34 an elastically yieldable thin-walled partition member in the form of a pair of partition walls 36, 38. The partition walls 36, 38 are adapted to form a pair of recesses 40, 42, respectively, which are spaced apart from each other by a certain distance in the circumferential direction of the rubber block 14. Each of the recesses 40, 42 is aligned with the corresponding portions of the aperture 22 and communicates with the pocket 32 through corresponding one of the circumferential grooves 24, 26. The partition walls 36, 38 are materially connected to the rubber block 14, at a circumferential position of the bushing between the openings of the two recesses 40, 42, as most clearly indicated in FIG. 4.

Figure 2:
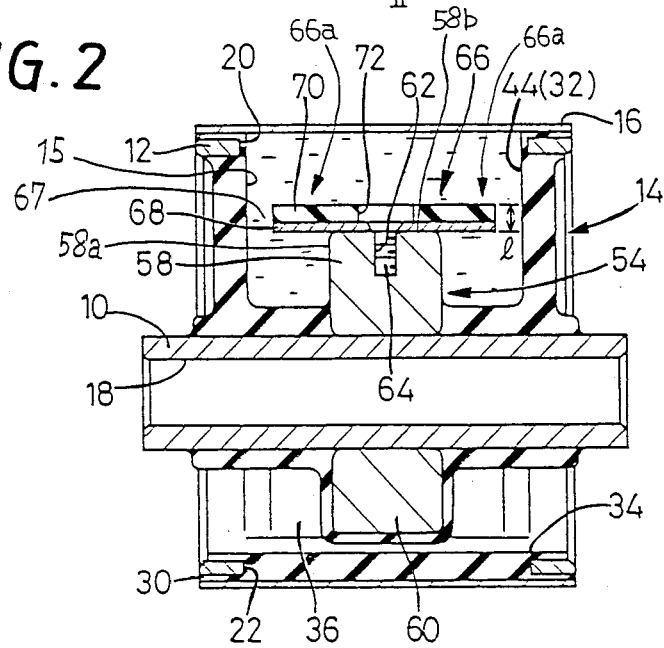
FIG. 2 and FIG. 3 are elevational views in transverse cross section of the resilient bushing, taken along lines II—II and III—III of FIG. 1, respectively.

In the present resilient bushing, the sealing sleeve 16 is fitted on the outer sleeve 12 which is secured to the outer circumferential surface of the rubber block 14, as illustrated in FIGS. 1 through 3, such that the pocket 32 and the recesses 40, 42, as well as the apertures 20, 22, are fluid-tightly closed by the sealing sleeve 16. Thus, the sealing sleeve 16 and the rubber block 14 cooperate to define a pressure-receiving chamber 44 which corresponds to the pocket 32, and a pair of equilibrium chambers 46, 48 which correspond to the recesses 40, 42. The circumferential grooves 24, 26 are also fluid-tightly closed by the sealing sleeve 16, whereby a pair of orifices 50, 52 are formed. These orifices permit restricted fluid flows between the pressure-receiving chamber 44 and each of the equilibrium chambers 46, 48. In the present embodiment, an operation to fit the sealing sleeve 16 onto the outer sleeve 12 is carried out within a mass of a suitable incompressible fluid such as water, alkylene glycols, polyalkylene glycols, silicone oil, low molecular weight polymers, or a mixture thereof. In this fitting process, the pressure-receiving chamber 44 and each of the equilibrium chambers 46, 48 are filled with the incompressible fluid.

In assembling the instant bushing, the sealing sleeve 16 fitting on the rubber block 14 is subjected to a suitable drawing operation to compress the outer sleeve 12 in the radially inward direction. The drawing operation may be achieved, for example, by using eight dies disposed around the sealing sleeve 16. The thus obtained bushing is further subjected to a suitable drawing operation.

The length and cross sectional area of the orifices 50, 52 are determined so that vibrations of a desired relatively low frequency range can be effectively damped due to inertia and resonance of the fluid masses in the orifices 50, 52 when the fluid is forced to flow through these orifices between the pressure-receiving chamber 44 and the equilibrium chambers 46, 48.

Figure 5:
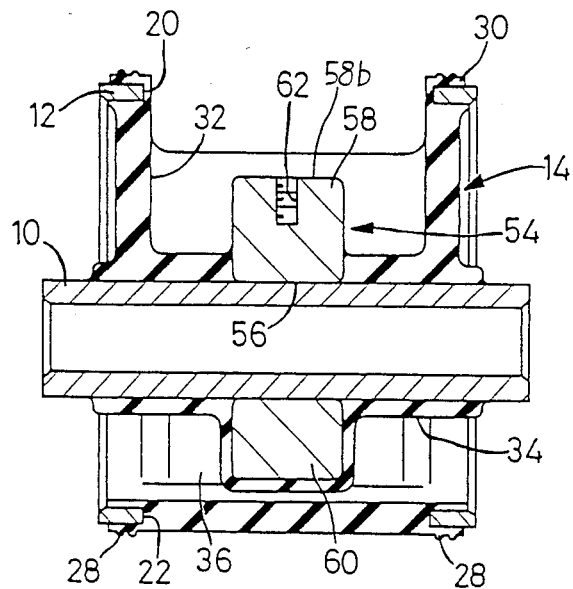
FIGS. 5, 6 and 7 are cross sectional views of the assembly of FIG. 4, taken along lines V—V, VI—VI and VII—VII of FIG. 4.

On the outer surface of an axially intermediate portion of the inner sleeve 10 secured to the inner surface of the rubber block 14, there is press-fitted a stopper block 54, such that a center bore 56 formed in the middle portion of the block 54 engages the outer surface of the inner sleeve 10, as indicated in FIGS. 4 through 6. The stopper block 54 has a generally elongate shape in transverse cross section as indicated in FIG. 4, and has a predetermined axial dimension as shown in FIG. 5. The stopper block 54 includes a base portion, and a pair of stopper portions 58, 60 which extend by a suitable dimension in the radial direction of the bushing, from the diametrically opposite ends of the base portion toward the pocket 34 and the void 34, respectively. The stopper portions 58, 60 are located opposite to each other in the vibration-input direction.

In the present embodiment, the stopper portions 58, 60 are adapted to prevent an excessive amount of relative displacement between the power unit and the body of the vehicle which are connected to the inner and outer sleeve 10, 12. As seen in FIG. 2, the stopper portion 58 within the pressure-receiving chamber 44 has a pair of side surfaces 58a which face the axially opposed surfaces 15 of the rubber block 14 defining an axial dimension of the pressure-receiving chamber 44. The side surfaces 58a are spaced apart from the corresponding axially opposed surfaces 15 of the rubber block 14, by a predetermined axial distance. The stopper portion 58 has a radial end face 58b which is spaced apart from the sealing sleeve 16 by a predetermined radial distance in the vibration-input direction. The periphery of the radial end face 58b is spaced apart from the periphery of the pressure-receiving chamber 44, more precisely, from the axially opposed surfaces 15, 15 of the rubber block 14, and the inner circumferential surface of the outer sleeve 12, in the direction perpendicular to the vibration-input direction. Thus, the periphery of the radial end face 58b of the stopper portion 58 cooperates with the periphery of the pressure-receiving chamber 44, to define therebetween an annular spacing in a plane perpendicular to the vibration-input direction and parallel to the axis of the bushing.

The rubber block 14 is secured by vulcanization to the inner sleeve 10 on which the stopper block 54 is press-fitted. The stopper portion 60 of the stopper block 54 which is disposed in the void 34 is covered with a rubber later having a suitable thickness. This rubber layer is an integral part of the rubber block 14.

In the present resilient bushing, a restrictor member 66 is fixedly disposed on the radial end face 58b of the stopper portion 58 within the pressure-receiving chamber 44. As shown in FIGS. 1 and 2, the restrictor member 66 is attached to the radial end face 58b by a screw 64 threaded in a tapped hole 62 formed in the stopper portion 58. The restrictor member 66 has a generally arcuate shape in transverse cross section of the bushing (FIG. 1), and a rectangular shape in axial cross section of the bushing (FIG. 2). The restrictor member 66 has a peripheral portion consisting of a pair of axial projections 66a and a pair of circumferential projections 66b. The axial projections 66a project a suitable distance in the axial direction of the bushing, from the side surfaces 58b of the stopper portion 58 of the stopper block 54, more precisely, from the axial ends of the radial end face 58b, so that the ends of the axial projections 66a are spaced apart from the corresponding axially opposed surfaces 15 of the rubber block 14 by a suitable axial distance. The circumferential projections 66b project from the periphery of the radial end face 58b in substantially the circumferential direction of the bushing, such that the ends of the projections 66b are spaced apart from the periphery of the pressure-receiving chamber 44, more precisely, from the inner circumferential surface of the outer sleeve 12, in the direction perpendicular to the vibration-input direction.

Thus, the axial and circumferential projections 66a, 66b of the restrictor member 66 cooperate with the axially opposed surfaces 15, 15 of the rubber block 14 and the inner surface of the outer sleeve 12, to define therebetween a rectangularly annular gap 67 in the plane perpendicular to the vibration-input direction and parallel to the axial direction of the bushing. This annular gap 67 is obviously smaller than the aforementioned annular spacing formed around the periphery of the radial end face 58b of the stopper portion 58, since the projections 66a, 66b project from the periphery of the radial end face 58b. Thus, the axial and circumferential projections 66a, 66b substantially divide the pressure-receiving chamber 44 into a radially inner section and a radially outer section, which communicate with each other through the comparatively narrow annular gap 67. When a vibrational load is applied to the bushing in the direction (vibration-input direction) in which the pressure-chamber 44 and the void 34 are disposed, the incompressible fluid is forced to flow between the radially inner and outer sections of the pressure-receiving chamber 44, in the radial direction of the bushing, through the annular gap 67.

The axial and circumferential projections 66a, 66b of the restrictor member 66 serve as damping means disposed within the pressure-receiving chamber 44, primarily for isolating high-frequency vibrations having a small amplitude. More specifically stated, a dimension l of the projections 66a, 66b as measured in the vibration-input direction, and an area of the annular gap 67 as measured in the plane perpendicular to the vibration-input direction and parallel to the axial direction of the bushing, are determined so that vibrations having a frequency range higher than that of the vibrations to be damped by the orifices 50, 52 may be effectively isolated, due to inertia of a mass of the incompressible fluid existing in the annular gap 67, and due to resonance of the fluid mass adjacent to the projections 66a, 66b, when the fluid is forced to flow through the annular gap 67 in the radial direction of the bushing upon application of such vibrations having comparatively high frequencies.

The restrictor member 66 consists of an inner metallic portion 68, and an outer rubber layer 70 secured to the outer surface of the inner metallic portion 68 by means of vulcanization. Reference number 72 in FIGS. 1 and 2, designates an access hole formed in the rubber layer 70, for driving the screw 64 into the tapped hole 62.

In the fluid-filled resilient bushing of the present invention constructed as described above, the incompressible fluid is forced to flow through the orifices 50, 52 between the pressure-receiving chamber 44 and the equilibrium chambers 46, 48, when the bushing receives low-frequency vibrations of a large amplitude in the direction of arrangement of the chamber 44 and the void 34, causing a relative displacement between the inner and outer sleeves 10, 12. In this event, the input low-frequency vibrations can be effectively damped, due to inertia and resonance of the fluid mass in the orifices 50, 52. It is noted that elastic expansion of the elastically yieldable partition walls 36, 38 permits the fluid to flow from the pressure-receiving chamber 44 into the equilibrium chambers 46, 48. Further, the fluid in the expanded equilibrium chambers 46, 48 flows into the pressure-receiving chamber 44 due to elastic contraction of the partition walls 36, 38.

Where the vibrations applied to the bushing have a relatively high frequency and a relatively small amplitude, the fluid is less likely or difficult to flow through the orifices 50, 52, and the dynamic spring constant of the bushing cannot be reduced to an extent sufficient to isolate such high-frequency small-amplitude vibrations. In this case, however, the high-frequency vibrations applied to the bushing cause restricted flow of the fluid through the annular gap 67 formed within the pressure-receiving chamber 44, whereby the high-frequency vibrations can be effectively isolated due to inertia and resonance of the fluid mass present in the annular gap 67, while the fluid is forced to flow between the radially inner and outer sections of the pressure-receiving chamber 44. Therefore, the present fluid-filled resilient bushing is capable of exhibiting improved high-frequency vibration isolating characteristic, over the conventional counterpart without such an annular gap (67).

It will be understood from the above description that the present engine mount bushing is equivalent to the conventional bushing in terms of damping characteristic for low-frequency vibrations of a large amplitude, and is significantly improved over the conventional bushing, in terms of isolating characteristic for high-frequency vibrations of a small amplitude. This indicates totally improved vibration damping and isolating capability of the fluid-filled engine mount constructed according to the present invention.

The above-indicated arrangement is significantly simpler in construction and more economical to manufacture, than the conventional engine mount.

Furthermore, the stopper portions 58, 60 disposed within the pressure-receiving chamber 44 and the axial void 34 are adapted to be abuttable at their radial end faces upon the sealing sleeve 16, in the event that the inner sleeve 10 and the outer sleeve 12 are excessively displaced relative to each other in the vibration-input direction. Stated differently, the stopper block 54 prevents an excessive amount of relative displacement between the power unit and the body of the vehicle.

While the present invention has been described in its preferred embodiment with a certain degree of particularity, for illustrative purpose only, it is to be understood that the invention is by no means confined to the precise details of the illustrated embodiment, but may be otherwise embodied.

For instance, while the restrictor member 66 used in the illustrated embodiment are formed separately from the stopper block 54, the restrictor member 66 or its inner metallic portion 68 may be formed as integral part of the stopper block 54. It is also possible to provide only one stopper portion 58, and eliminate the other stopper portion 60 disposed within the void 34. Further, the dimension of the stopper block 54 as measured in the axial direction of the mount may be selected as needed.

In the present embodiment, the outer sleeve 12 has the single common aperture 22 whose circumferential end portions are aligned with the respective recesses 40, 42 corresponding to the two equilibrium chambers 46, 48. However, it is possible that the outer sleeve 12 has two separate apertures aligned with the respective recesses 40, 42. It is further possible to provide a single equilibrium chamber, or to adapt only one of the recesses 40, 42 to provide a single equilibrium chamber.

Although the inner and outer sleeves 10, 12 of the illustrated engine mount are disposed such that these two sleeves are eccentric with each other by a suitable radial distance in the vibration-input direction, the inner and outer sleeves 10, 12 may be disposed in concentric relation with each other.

While the illustrated embodiment of the fluid-filled bushing has been described as an engine mount for the F-F (front-engine front-drive) vehicle, the present bushing may also be used for the other purposes, for example, as a bushing for the suspension system of an automotive vehicle. Where the present bushing is used as a vehicle suspension bushing, it is common that the inner and outer sleeves (10, 12) are disposed cocentrically with each other.

It is further to be understood that the invention may be embodied with various other alterations, modifications and improvements which may occur to those skilled in the art, without departing from the spirit and scope of the invention defined in the following claims.

What is claimed is:

1. A fluid-filled resilient bushing, comprising:
   an inner sleeve;
   an outer sleeve disposed in radially outwardly spaced-apart relation with said inner sleeve, and having a plurality of apertures;
   a sealing sleeve fitted on an outer circumferential surface of said outer sleeve, so as to fluid-tightly close said plurality of apertures;
   a generally annular resilient member interposed between said inner and outer sleeves so as to connect the inner and outer sleeves, and having a pocket and an axial void which are located opposite to each other in a diametric direction of said inner sleeve parallel to a first direction in which the bushing receives a vibrational load, said pocket being aligned with one of said apertures in said outer sleeve, and said void being formed over an entire axial length of said resilient member;

said sealing sleeve and said resilient member cooperating to define a fluid-tight pressure-receiving chamber such that said one of the plurality of apertures is fluid-tightly closed by said sealing sleeve, said pressure-receiving chamber being filled with an incompressible fluid;

an elastically yieldable thin-walled partition member disposed in said axial void, so as to form at least one recess aligned with the rest of said plurality of apertures, respectively, said sealing sleeve and said resilient member cooperating to define at least one equilibrium chamber such that said rest of the apertures is fluid-tightly closed by said sealing sleeve, said at least one equilibrium chamber being filled with said incompressible fluid;

means for defining at least one orifice which communicates with said pressure-receiving chamber and said at least one equilibrium chamber, and which permits flows of said incompressible fluid between said pressure-receiving chamber, and said at least one equilibrium chamber;

a stopper block supported by said inner sleeve, and having a stopper portion which is disposed within said pressure-receiving chamber and which extends from a bottom of said pocket, substantially in said first direction, said stopper portion having a radial end face spaced apart from said outer sleeve by a predetermined radial distance in said first direction, said radial end face having a peripheral edge which is spaced apart from a periphery of said pressure-receiving chamber in a second direction perpendicular to said first direction, said peripheral edge of said radial end face and said periphery of said pressure-receiving chamber cooperating to define therebetween an annular spacing in a plane which is parallel to said second direction and an axial direction of said resilient member;

damping means provided on said radial end face of said stopper portion of said stopper block, said damping means projecting from said peripheral edge of said radial end face substantially in said second direction, such that said damping means cooperates with said periphery of said pressure-receiving chamber, to define in said plane an annular gap which is smaller than said annular spacing.

2. A fluid-filled resilient bushing according to claim 1, wherein said damping means forms a peripheral portion of a restrictor member secured to said radial end face of said stopper portion.

3. A fluid-filled resilient bushing according to claim 2, wherein said restrictor member has a pair of axial projections which project from said peripheral edge of said radial end face of said stopper portion of said stopper block, and a pair of circumferential projections which project from said peripheral edge of said radial end face in a substantially circumferential direction of said generally annular resilient member, said pair of circumferential projections being spaced apart from an inner circumferential surface of said outer sleeve by a predetermined distance in said second direction.

4. A fluid-filled resilient bushing according to claim 2, wherein said restrictor member includes a radially inner metallic portion secured to said radial end face of said stopper portion, and a radially outer elastic portion secured to said radially inner metallic portion.

5. A fluid-filled resilient bushing according to claim 2, wherein said restrictor member has a generally arcuate cross sectional shape in a plane perpendicular to an axis of the bushing.

6. A fluid-filled resilient bushing according to claim 2, wherein said restrictor member is secured to said radial end face of said stopper portion by threaded fastening means.

7. A fluid-filled resilient bushing according to claim 2, wherein a dimension of said peripheral portion of said restrictor member as measured in said first direction, and an area of said annular gap as measured in said plane, are determined so that high-frequency vibrations are isolated in said pressure-receiving chamber.

8. A fluid-filled resilient bushing according to claim 1, wherein said stopper block has another stopper portion disposed within said void.

9. A fluid-filled resilient bushing according to claim 1, wherein said elastically yieldable partition member includes a pair of partition walls defining a pair of recesses which cooperate with said sealing sleeve to define a pair of equilibrium chambers.

10. A fluid-filled resilient bushing according to claim 1, wherein said means for defining an orifice comprises said outer sleeve and said sealing sleeve, said outer sleeve having at least one circumferential groove formed in the outer circumferential surface thereof, said orifice being formed such that said at least one circumferential groove is closed by said sealing sleeve.

11. A fluid-filled resilient bushing according to claim 1, wherein said pocket is formed in an axially middle portion of said generally annular resilient member.

12. A fluid-filled resilient bushing according to claim 1, wherein said inner and outer sleeves are disposed eccentrically with each other in said first direction, so that said inner and outer sleeves are brought into concentric relation with each other when the bushing is mounted in place.

* * * * *